Aug. 28, 1923.

E. GORANSON

POTATO CUTTING MACHINE

Filed May 8, 1922

INVENTOR.
EMIL GORANSON.
BY HIS ATTORNEY.
James F. Williamson

Aug. 28, 1923.
E. GORANSON
POTATO CUTTING MACHINE
Filed May 8, 1922
3 Sheets-Sheet 2
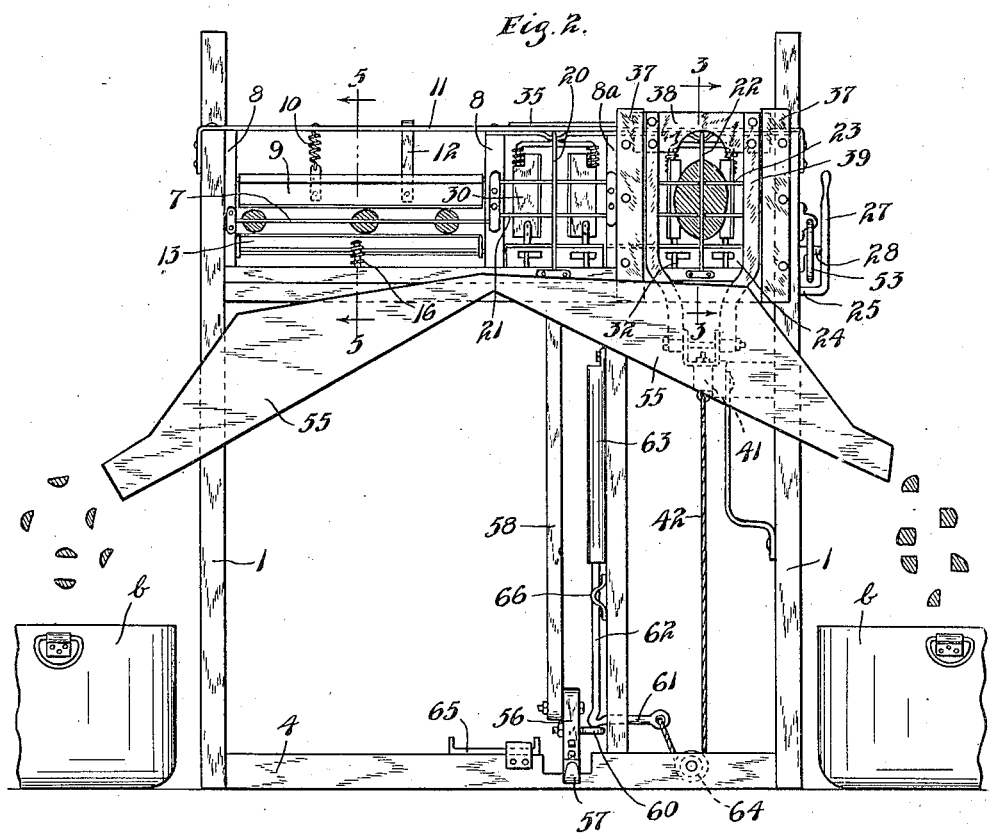
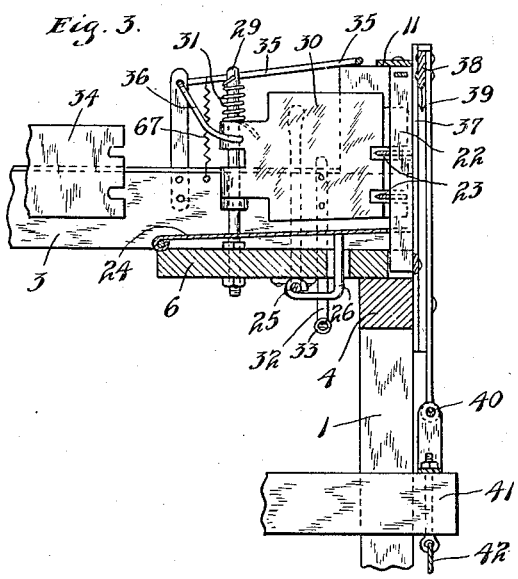
INVENTOR.
EMIL GORANSON
BY HIS ATTORNEY.
James F. Williamson Aug. 28, 1923.
E. GORANSON
POTATO CUTTING MACHINE
Filed May 8, 1922
1,465,981
3 Sheets-Sheet 3
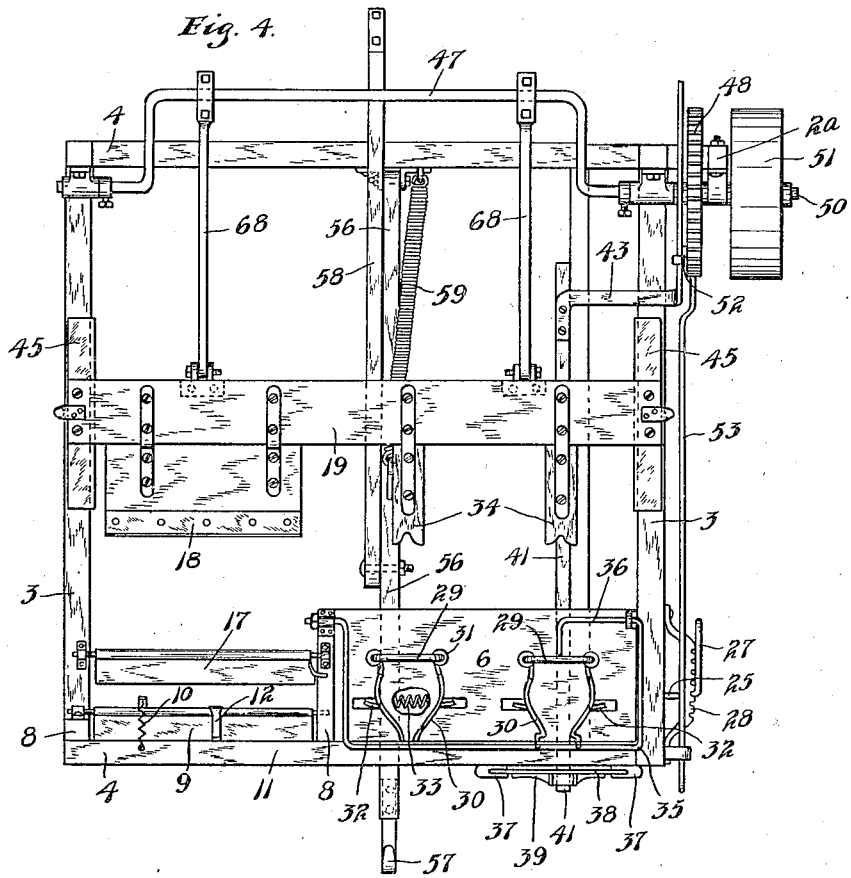
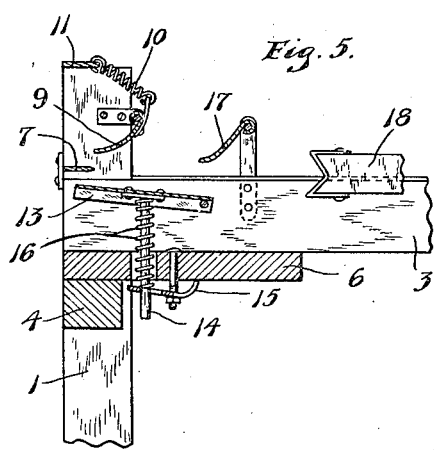
INVENTOR.
EMIL GORANSON
BY HIS ATTORNEY.
James F. Williamson Patented Aug. 28, 1923.

1,465,981

UNITED STATES PATENT OFFICE.

EMIL GORANSON, OF LAKE PARK, MINNESOTA.

POTATO-CUTTING MACHINE.

Application filed May 8, 1922. Serial No. 559,251.

*To all whom it may concern:*

Be it known that I, EMIL GORANSON, a citizen of the United States, residing at Lake Park, in the county of Becker and State of Minnesota, have invented certain new and useful Improvements in Potato-Cutting Devices; and I do hereby declare the following to be a full, clear, and exact description of the invention, such as will enable others skilled in the art to which it appertains to make and use the same.

This invention relates to a vegetable or fruit cutting machine and is particularly designed for cutting of seed potatoes. As is well known, such potatoes are cut into sections for planting and where a large acreage is planted in potatoes the cutting of the seed potatoes by hand becomes a task of huge proportions.

It is an object of this invention, therefore, to provide a machine which can be operated either by engine power or man power to rapidly and efficiently cut the potatoes.

It is a further object of the invention to provide such a machine having separate and simultaneously operable means for cutting potatoes of different sizes.

It is another object of the invention to provide a cutting means for the potatoes and a resiliently and yieldingly mounted means for guiding the potatoes in proper position to the cutting means.

It is still another object of the invention to provide a cutting means comprising spaced stationary knives arranged in planes intersecting substantially at right angles in combination with a movable knife moving adjacent said stationary knives and in a plane at right angles to the planes of said knives.

It is a still further object of the invention to provide cutting and guiding means for the potatoes and an adjustable supporting means to locate the potatoes in correct position to the cutting and guiding means.

It is also an object of the invention to provide simple and efficient mechanism for operating the various means operating to move and cut the potatoes.

These and other objects and advantages of the invention will more fully appear in the following description made in connection with the accompanying drawings in which like reference characters refer to the same parts throughout the different views, and in which—

Fig. 2 is a view in front elevation thereof;

Fig. 3 is a vertical section taken on the line 3—3 of Fig. 2, as indicated by the arrows;

Fig. 4 is a plan view of the machine;

Fig. 5 is a vertical section taken on the line 5—5 of Fig. 2, as indicated by the arrows.

Figure 1:
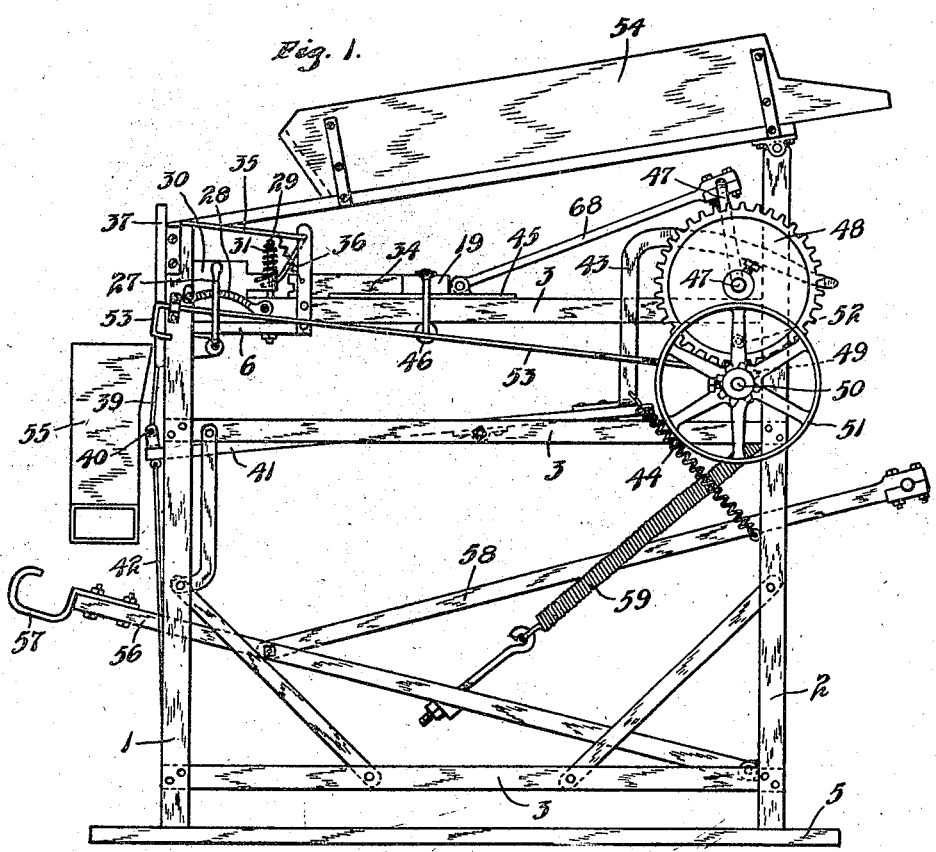
Fig. 1 is a view in side elevation of the machine.

Referring to the drawings, the machine comprises a frame of general rectangular shape comprising spaced vertical front members 1, spaced vertical rear members 2 and a plurality of horizontal members 3 connecting said front and rear members. A plurality of cross members 4 also connect the vertical members 1 and 2 at the front and rear of the machine and the frame, if desired, may be connected to the base 5 of suitable construction. The various members of the frame are also provided with diagonal brace members, as clearly shown in Fig. 1. The frame may be made of suitable timbers, as illustrated, or, if desired, the same can be made of metal, of angle form or other desired shape.

A plate or board member 6 is provided extending across the front of the machine adjacent the upper end thereof and forms a base for various parts operating on the potatoes. At one side of the machine, which is the left side, as seen in Figs. 2 and 4, a knife 7 is provided shown as being disposed in a substantially horizontal plane and having its edge facing rearwardly of the machine, this knife being secured to auxiliary vertical members 8 of the frame extending above the top cross member 4 as shown in Fig. 5. Mounted on a rod a short distance above the knife 7 and extending transversely between the members 8 is a curved plate 9 mounted to swing on said rod and having a rearwardly projecting lug connected by a coiled spring 10 to a bar 11 extending across the front of the machine and secured to the top of the front vertical member 1. An arm 12 is also secured to the plate 9 and extends to the rear thereof and is curved to contact with the bar 11 to form a stop to determine the normal position of the plate 9. The front edge of the plate 9 can thus swing vertically or away from the knife 7 against the tension of spring 10 and the said plate will be returned to its normal position by said spring. A plate 13 of considerable longitudinal extent forwardly and rearwardly of the machine is also pivotally mounted on a rod extending between the members 8 and has its front end disposed a short distance below the knife 7. A rod 14 is secured to the underside of the plate 13 and extends downwardly through the plate 6 and through a small bracket 15 bolted to the underside thereof. A coiled spring 16 surrounds the rod 14 and urges the plate 13 upwardly. This rod 14 engages the front end of a slot in the bracket 15 to form a stop means for the upper movement of the plate 13. Said plate can thus be forced downward against the tension of the spring 16 and will be returned to its normal position by said spring. A plate 17 is swingingly mounted on a rod extending between straps upstanding from the side member 3 and one of the members 8. This plate 17 is mounted for free swinging movement and normally occupies the position shown in Fig. 5. A potato is adapted to be dropped in front of the plate 17 and guided thereby onto the plate 13 and means is provided for pushing the potato forwardly. Such means comprises a member 18 having a V-shape recessed forward end, which member is of slightly less transverse extent than the knife 7 and is moved by a member 19 extending transversely of the frame and movable thereon.

Between the member 8 shown at the right and another auxiliary vertical frame member 8ª spaced to the right thereof is mounted a knife 20 disposed substantially in a vertical plane with its edge facing rearwardly and spaced knives 21 extended from each side of said knife adjacent the central portion thereof in substantially horizontal planes having their edges facing rearwardly and being secured to the members 8 and 8ª. Secured between the vertical member 8ª and the front vertical member 1 at the right hand side of the frame, as seen in Figs. 2 and 4, is another knife 22 also disposed substantially in a vertical plane with its edge facing rearwardly and spaced knives 23 extend at each side thereof adjacent its central portion disposed in substantially horizontal planes and having their edges facing rearwardly. The vertical knives 20 and 22 are secured to the front edge of the plate 6 and to an auxiliary strap member disposed immediately below and riveted to the member 11. A plate 24 is pivotally mounted at its rear edge adjacent the rear edge of the plate 6 and a short distance above the same and extends forwardly to the front edge of the knives 20 and 23, being slotted to embrace said knives and this plate extends transversely substantially the entire distance between the member 8 at the right and the right hand vertical member 1, as clearly shown in Figs. 2 and 4. A rod 25 is rotatably mounted and extends transversely beneath the member 6 and has an arm 26 secured to its inner end, which arm extends upwardly through an opening in the plate 6 in contact with the bottom of the plate 24. The rod 25 is provided at its outer end with a handle 27 formed with a pawl tooth thereon adapted to move in engagement with a toothed quadrant 28 secured to the side of the frame and the rod 25 is normally spring pressed into engagement with said quadrant by a spring, not shown, attached to its inner end and to the bottom of member 6. By swinging the handle 27 to various positions it will be seen that the plate 24 can be raised to various positions and held in such positions by the engagement of the handle 27 and the quadrant 28.

A pair of yoke or bail members 29 have their ends threaded and bolted into the plate 6 and upstanding therefrom some distance back of the knives 20 to 23, the plate 24 being provided with holes to accommodate the passage of these members. Reversely formed curved plates 30 are pivotally mounted at their rear ends to the sides of the yokes 29 and springs 31 surround the upper ends of said sides and are connected thereto and to the plates 30 and normally swing the same toward each other. The plates 30 extend forwardly past the front of the knives 21 and 23 and are slotted to accommodate said knives. The plates 30 also have depending arms 32 extending downwardly through the plates 24 and 6, which arms are connected by a coiled tension spring 33 which also tends to keep the pairs of the plates 30 in substantially the position shown in Fig. 4. A pair of members 34 project inwardly from and are secured to the transverse member 19, which members are arranged to respectively, pass between the pairs of plates 30 when the member 19 moves forwardly. A guard member comprising a rod 35 bent into a bail form and pivoted in upstanding brackets is secured to the members 8 and 3, and its front edge is adapted to contact the top of the members 8 and 1 and this rod has projecting from its rear end an arm 36, the end of which extends downwardly into the path of one of the members 34 so that when the latter member moves forwardly said arm and the front portion of the bail will be elevated. When the member 34 moves rearwardly the bail will be again drawn downwardly to its normal position by a spring 67 secured thereto and one of the frame members 3.

Mounted on the front of the member 8ª and the right hand vertical members 1 are vertically slotted guide members 37 and a knife member 38 has its ends disposed in said members and is guided for vertical movement therein. The knife 38 is shown as having a semi-circular recess cut in its central portion and straps 39 are secured at each side thereof adjacent the guide members 37, which straps extend downwardly and are connected by a headed and nutted bolt 40 extending through lugs formed on the lower ends. Said bolt is embraced by the upwardly projecting sides of a U-shaped strap which serves as the connecting means to a lever 41 to the lower edge of which is connected a flexible member 42. The knife 38, as will be clear from Figs. 3 and 4, is adapted to move closely adjacent to the front end of the knives 22 and 23. The lever 41 extends rearwardly and is pivoted intermediate its ends to one of the cross members 3, as shown in Fig. 1 and has connected thereto adjacent its rear end an upstanding arm 43 which is bent rearwardly to form a cam. A spring 44 is connected to said arm 43 and to the rear end of the frame and normally holds the front end of the lever 41 and the knife 38 in their elevated position shown in Fig. 2.

The member 19 is provided with angle members 45 at each side adapted to form guides fitting the frame members 3 and said member is also provided with brackets depending at the outside of the members 3 and carrying rollers 46 adapted to travel along the undersurface of the said members 3. The bar 19 is thus guided for easy movement forward and rearward of the machine and is so moved by a crank shaft 47 pivotally mounted in brackets secured to the rear upstanding members 2, said shaft being held in position longitudinally by collars secured thereto by set screws and disposed adjacent said bearing. Pitman links 68 connect the crank portion of the shaft 47 to the member 19. A gear 48 is connected to the crank shaft 47 outside of its right hand bearing, which gear is driven by a pinion 49 secured to a short counter shaft 50 secured in bearings bolted to one of the rear members 2 and an auxiliary vertical rear member 2ª, which shaft is adapted to be driven by a belt running over a pulley 51 secured to said shaft and connected to any suitable source of power. The gear 48 is formed with a central web and a cam roller 52 is revolubly bolted to the web and adapted to move in engagement with the rearwardly extending portion of arm 43. It will thus be seen, as the gear revolves the arm 43, lever 41 and knife 38 will be reciprocated. A rod 53 having a handle portion at its front end is rotatably mounted in small brackets secured to the vertical members 1 and 2, which rod has a crank portion adjacent its rear end adapted to contact with the rearwardly extending portion of arms 43 and move the same to the left, as shown in Fig. 4, out of line of the cam roller 52, the lever 41 being sufficiently loosely mounted to accommodate such movement. Obviously, when the rod 53 is turned to move arm 43 the knife 38 will not be operated. A hopper 54 is mounted above the machine on the vertical members of the frame, being pivotally mounted on the rear members and having its front end supports resting on the strap member 11. The hopper is closed at its front end and open at its rear end and is adapted to contain the potatoes to be cut. Chutes 55 extend across the front of the machine to each side and are adapted to receive the cut potatoes and guide the same into receptacles b disposed at each side of the machine.

The machine is also provided with means so that it can be operated by man power, and to this end, a treadle lever 56 is pivoted to the rear bottom portion of the frame and extends forwardly projecting at the front end where it is provided with a member 57 for engagement by the foot of the operator or from which a stirrup may be hung to be engaged by said foot. The member 56 has a pitman 58 pivoted thereto adjacent its forward portion and adapted to be connected at its rear end to the central part of the crank shaft 47 and a strong spring 59 is connected to the treadle bar 56 and to the rear of the frame adapted to hold the same in elevated position and the crank shaft 47 in position with the member 19 withdrawn. The treadle lever 56 has a bracket 60 projecting at one side adjacent its front end and this bracket is adapted to engage with the laterally bent portion 61 of a rod 62 vertically movable in a sleeve 63 secured to one of the vertical frame members. The projection 61 has an eye at its end to which is connected the end of the flexible member 42, said flexible member running over a pulley 64 journaled inside of one of the transverse frame members 4 which frame member is also slotted to accommodate the downward movement of the bar 56. A member 65 is mounted for sliding movement on top of the bar 4 and adapted to move over the top of the bar 56 when in its lowest position so that the same may be held in said position, if desired. A cam lug 66 is secured to the side of the vertical frame member carrying sleeve 63 and adapted to contact with the bracket 60 to swing the bar and move said bracket out of contact with projection 61. It will be seen as the treadle bar 56 rises under the action of spring 59 that bracket 60 will carry rod 62 upwardly and the flexible member 42 will thus pull down the knife 38. The knife will be released when bracket 60 passes cam lug 66 and will be again elevated by spring 44 acting on lever 41. Movement of the treadle 56, therefore, will both move the member 19 and operate the knife 38. When the pulley drive is used the pitman 58 is disconnected, as shown in Fig. 1.

In operation, the potatoes of various sizes which are to be cut will be placed in the hopper 54. The operator will stand at the front of the machine and power will be applied to the same, either through the pulley 51 or the treadle bar 56. The operator will take potatoes from the hopper and place the same on the plates 13 and 24. Potatoes of largest size which it is desired to cut into twelve pieces will be placed between the jaws 30 shown at the right in Figs. 2 and 4. The potatoes of the size which it is desired to cut into only six pieces will be placed between the jaws 30 at the left which are in the rear of the knife 20, and the potatoes which it is desired cut into but two parts will be placed on plate 13 in front of knife 7. These potatoes will merely be dropped in front of the plate 17 and will be too large to slide backwardly past said plate. The potatoes being in position the member 19 moves forwardly and the members 18 and 34 move forward and contact the potatoes. As the potatoes are moved between the plates 9 and 13 said plates will yield substantially the same amount since their springs will be so adjusted as to obtain this result, and the same will be cut substantially in half as the member 18 pushes them past the knife 7. The cut pieces of potatoes will drop into the chute 55 and be delivered into one of the receptacles b. As the members 34 move forwardly they will push the potatoes between the jaws 30 forwardly and separate the front portions of said jaws. The jaws of each pair will move in substantially the same direction so that the potatoes will be centered and properly presented to the knives. The vertical knives will cut substantially through the center of the potato, and the plate 24 will be properly adjusted to bring the center of the potato in front of the horizontal knives 21 and 23. The potatoes will be pushed through the knives 20 and 21 and will be cut into six pieces and dropped into the chute 55 at the right. The larger potatoes will be pushed through the knives 22 and 23 and will project at the forward end of the knives. The knife 30 will now be operated either by the flexible member 42 or by lever 41 and the six sections of the potato will be again divided approximately in half and the forward portion of the sections will drop into the chute 55 and be delivered to the right hand receptacle b. When the next potato is delivered to the knives the parts of the potato left therein will be pushed out and the operation described will be repeated. As before stated, when the pulley drive is used the knife 38 is reciprocated through the medium of lever 41 and straps 39 and when the treadle drive is used the same is reciprocated through the medium of the flexible member 42.

When the pushers 18 and 34 move forwardly the guard bail 35 is raised and the operator will be warned not to place a potato or get his hands in front of the pushers.

As considerable dust is usually carried by the potatoes it is often desired to clean the hopper 54 and this can be done by merely raising its front end and discharging its contents through its rear open end.

From the above description it is seen that applicant has provided a machine by which potatoes may be rapidly and accurately cut into pieces for planting. The parts of the machine are simple and comparatively few and the machine can be easily made from material that is readily obtained. When once assembled the parts have no tendency to become disarranged and very little attention will be required for maintenance.

It will, of course, be understood that various changes may be made in the form, details and arrangement of the parts without departing from the scope of applicant's invention, which, generally stated, consists in the matter shown and described and set forth in the appended claims.

What is claimed is:

1. A machine for cutting potatoes and similar articles having in combination, a horizontally disposed knife for dividing the potato into two parts, a pivoted adjustable supporting plate against said knife, cutters having vertically and horizontally disposed edges for dividing potatoes into four or six parts, cutters having vertically and horizontally disposed edges for dividing the potatoes into twelve parts, and adjustable pivoted potato supporting plate adjacent said cutters, separate means for moving potatoes into engagement with each of said cutters, and a common actuator for said last mentioned means.

2. A machine for cutting potatoes and similar articles having in combination, a horizontally disposed knife, a plurality of sets of knives having vertically and horizontally disposed intersecting edges, adjustable substantially horizontal potato supporting means adjacent said knives, separate pushers for said first mentioned knife and each of said sets of knives, a common reciprocating cross head carrying said pushers and a power driving shaft constituting a crank connected to said cross head for reciprocating the same.

3. A machine for cutting seed potatoes having in combination, cutters having vertically and horizontally disposed intersecting edges, a yielding substantially horizontal adjustable potato supporting plate extending to said knives, separable converging vertical jaws above said plate, spaced vertical guides at one side of said cutters, a vertically reciprocating knife guided therein adjacent said cutters, resilient means for elevating said knife and holding the same normally elevated, a potato moving means for moving potatoes over said plate through said vertical jaws and against said cutters, and means connected to and operated by said potato moving means for depressing said last mentioned knife against the tension of said resilient means and releasing the same to cause a rapid vertical movement thereof.

4. A machine for cutting potatoes having in combination, cutters having vertical and horizontally disposed intersecting edges, an adjustable pivotally mounted swinging plate for supporting potatoes adjacent said cutters, yielding jaws for centering potatoes relatively to said knives, a vertically reciprocating knife movable adjacent said cutters, resilent means for elevating said knife and holding the same normally in elevated position, a lever connected to said knife, a pusher member for moving potatoes over said potato supporting plate between said centering jaws and against said cutters, a crank shaft for operating said pusher, a cam on said shaft, a cam arm on said lever co-acting with said cam to move said knife downwardly, and means for moving said arm out of the path of said cam to throw said knife out of operation.

5. A machine for cutting potatoes having in combination, a rectangular frame, sets of cutters having vertically and horizontally disposed edges at the front portion thereof, adjustable potato supporting plates in the rear of said cutters, horizontal guides in said frame, a cross head movable therein having pushers for moving potatoes against said cutters, a power crank shaft journaled transversely in the rear of said frame, pitman links connecting said shaft and crosshead, potato carrying means above said frame and oppositely disposed chutes at the front of said frame for receiving the cut potatoes from said cutters.

6. The structure set forth in claim 5, spaced vertical guides in front of one set of cutters, a knife movable vertically in said guides adjacent said set of cutters, a spring for moving said knife upwardly, and means including a cam on said crank shaft for moving said knife downwardly.

7. A machine for cutting potatoes and similar articles having in combination, spaced knives disposed at right angles to each other with vertically and horizontally disposed edges, a knife movable in a plane at right angles to said knives and adjacent thereto, a spring for moving said last mentioned knife in one direction, a member for moving a potato into engagement with said knives, a power shaft and connections thereto for moving said member, means for moving said shaft, and means connected to said last mentioned means and to said movable knife including a cam and lever for moving the same in the other direction.

8. A machine for cutting potatoes and similar articles having in combination, a series of potatoes cutting means, yieldingly mounted means for guiding and centering the potatoes in relation to each of said cutting means, yieldingly mounted and adjustable means for supporting said potatoes, a plurality of pusher members co-operating with said cutting, supporting and guiding means, respectively, a member to which said pusher members are connected, a crank shaft, and means connecting said crank shaft to said last mentioned member.

9. A machine for cutting potatoes and similar articles having in combination, cutting means, a support for potatoes adjacent said means, means for moving a potato into engagement with said cutting means, and a swingable guard member pivoted above said cutting means and raised by said last mentioned means to warn the operator of danger.

In testimony whereof I affix my signature.

EMIL GORANSON.